(12) United States Patent
Liegeois

(10) Patent No.: US 6,217,032 B1
(45) Date of Patent: Apr. 17, 2001

(54) CROSS-OVER BETWEEN A ROUND SEAL AND A FLAT SEAL

(75) Inventor: Christian Liegeois, Soisy sur Seine (FR)

(73) Assignee: Cables Pirelli, Saint Maurice (FR)

( * ) Notice: Subject to any disclaimer, the term of this patent is extended or adjusted under 35 U.S.C. 154(b) by 0 days.

(21) Appl. No.: 09/337,671

(22) Filed: Jun. 22, 1999

(30) Foreign Application Priority Data

Jun. 23, 1998 (FR) .................................................. 98 07905

(51) Int. Cl.[7] .............................. H01B 17/30; H02G 3/16
(52) U.S. Cl. ....................... 277/602; 277/616; 174/65 R; 174/153 G
(58) Field of Search .................................... 277/602, 603, 277/616, 627, 637, 641; 174/65 R, 153 G, 65 G, 152 G

(56) References Cited

U.S. PATENT DOCUMENTS

| | | | |
|---|---|---|---|
| 982,535 | * | 1/1911 | Rudkiewicz ..................... 174/65 R X |
| 2,902,536 | * | 9/1959 | Huth ................................. 174/153 G |
| 3,328,513 | * | 6/1967 | Goldsobel ............................... 174/81 |
| 3,482,032 | * | 12/1969 | McVoy, Jr. ......................... 174/65 R |
| 3,728,470 | * | 4/1973 | Maier ............................. 174/65 R X |
| 3,742,119 | * | 6/1973 | Newman ............................. 174/65 R |
| 4,180,297 | * | 12/1979 | Abrams ........................ 174/153 G X |
| 4,302,035 | * | 11/1981 | Ochwat ........................... 174/65 R X |
| 4,851,611 | * | 7/1989 | De Concini et al. .......... 174/65 G X |
| 4,988,831 | * | 1/1991 | Wilson et al. ..................... 174/65 R |
| 5,170,017 | * | 12/1992 | Stanevich et al. ............... 174/153 G |
| 5,245,131 | * | 9/1993 | Golden et al. ................... 277/616 X |
| 6,143,983 | * | 11/2000 | Burton et al. ...................... 174/65 R |

FOREIGN PATENT DOCUMENTS

| | | |
|---|---|---|
| 2758400 | 7/1998 | (FR) . |
| 0695900 | 2/1996 | (WO) . |
| WO 96/19024 | 6/1996 | (WO) . |

* cited by examiner

Primary Examiner—B. Dayoan
Assistant Examiner—Robert G. Santos
(74) Attorney, Agent, or Firm—Finnegan, Henderson, Farabow, Garrett & Dunner, L.L.P.

(57) ABSTRACT

The invention relates to a sealing device constituted by a round seal (12), that is to say a seal having a non-planar outer surface, and by a flat seal (3) which are contiguous, characterised in that, on either side of the round seal (12) and in the area of the flat seal (3), projects a planar lug (5a, 10a; 5b, 10b) moulded in a single piece with the seal body (12), each of the said two lugs (5a, 10a; 5b, 10b) fitting into a cut out portion of a matching shape provided in the flat seal (3), so as to locate the interface between the round seal (12) and the flat seal (3) entirely in the plane of the latter.

4 Claims, 2 Drawing Sheets

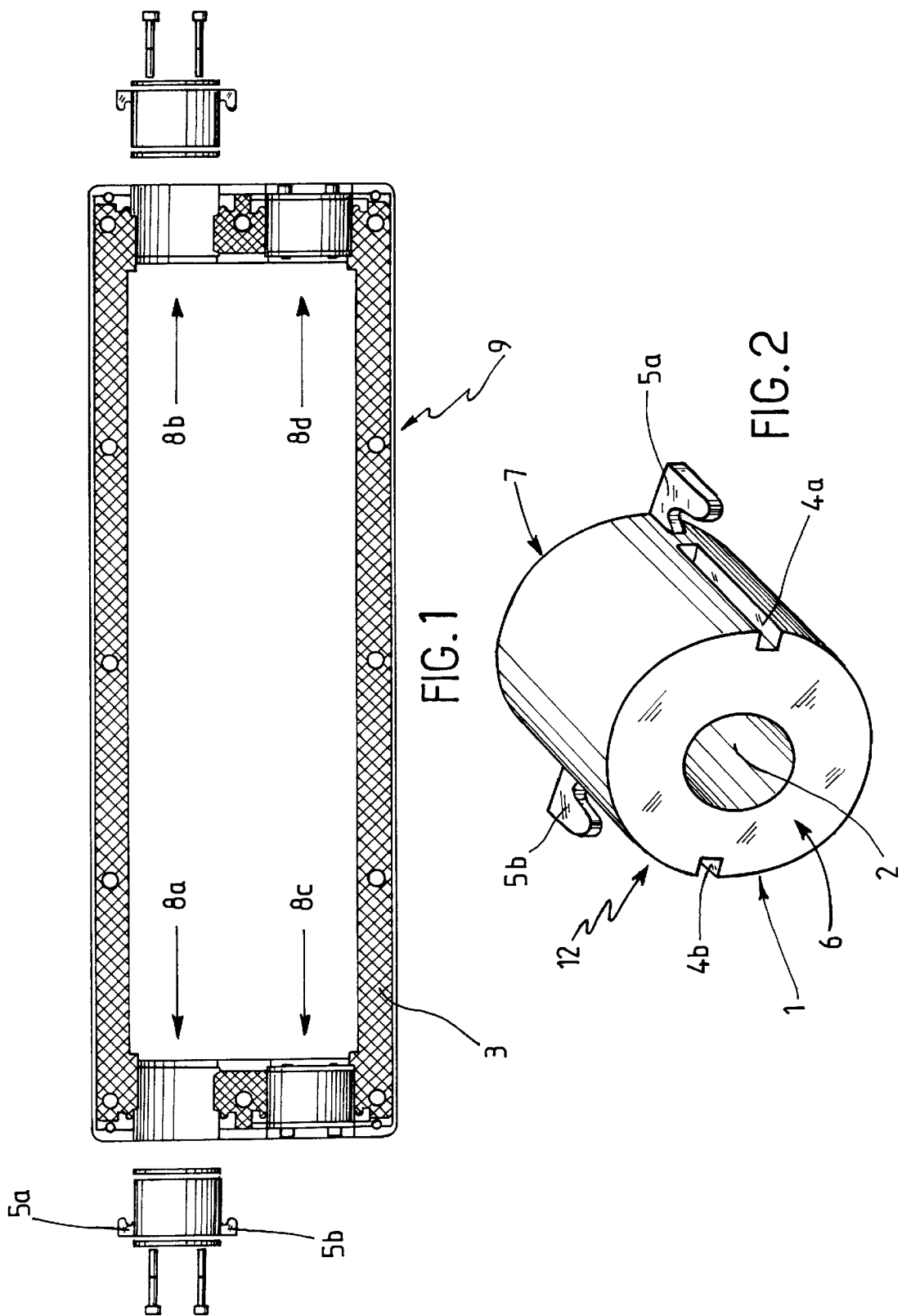

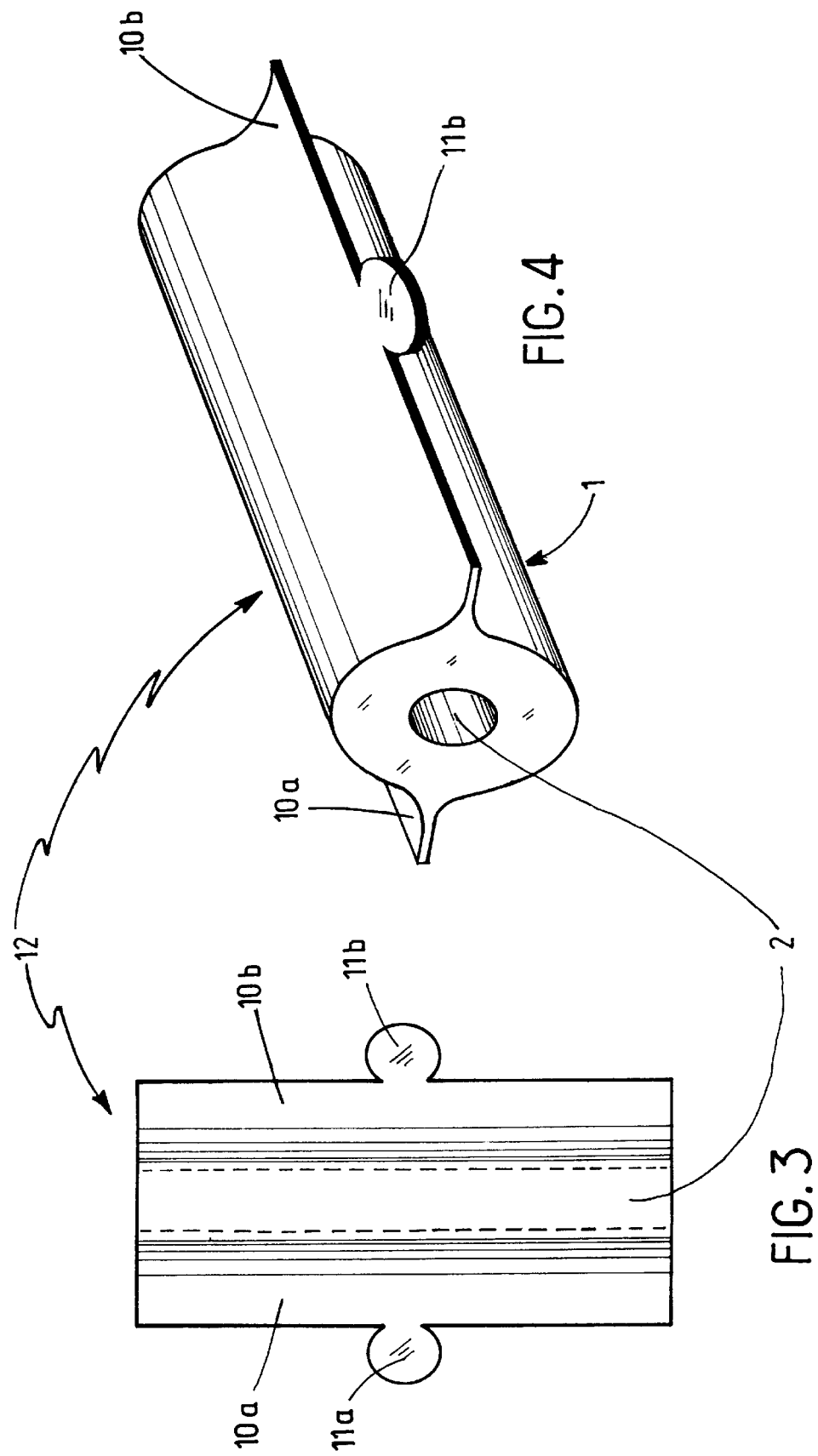

CROSS-OVER BETWEEN A ROUND SEAL AND A FLAT SEAL

The present invention relates to sealing devices comprising several seals having different radii of curvature, which have to be placed next to one another to ensure the continuity of the external surface of a region that it is wished to protect against infiltration by liquids or dust.

The invention applies, in particular, to devices for connecting electric or optical cables in which the connection area is protected by a tight enclosure which can, when it is wished to change the way in which the cables are connected, be opened and then re-closed.

Such a cable connecting device is the object of a patent application filed by the same applicant as in the case of the present invention. It includes a box having at least two parts separated by a flat seal disposed on the periphery of the box, but interrupted in the area of the input/output ports, each of these ports taking the form of facing cut out portions on the said parts of the box and being filled by a through seal. The latter enclose each cable in a sleeve, preferably of elastomer and preferably essentially cylindrical in shape, pierced by a number of longitudinal through holes provided for an equal number of cables using the input/output port in question. For the sake of tightness, the through seal radially compresses the cables when the box is reclosed.

In such devices, it has been noted that sealing defects could occur in the area of the cross-over between each round through seal and the flat peripheral seal.

To solve this problem, it has been suggested to provide the round seal with longitudinal grooves, into which the edges of the flat seal would be inserted. As the round seal is compressed when the connecting box is closed, there was reason to hope that the compression of the flat seal edge in the groove would ensure satisfactory tightness. This was unfortunately found not to be the case, with infiltration occurring in the area of the edges of the groove.

It is perfectly clear that the problem in question is posed not only in the technical field of cable connections, but quite generally in any technical design necessitating contiguous seals with different radii of curvature.

The solution provided by the present invention to improve the tightness afforded by the said seals is to transfer their interface entirely into the plane of the planar seal. For this purpose, a flat lug, moulded in one piece with the planar seal, projects on either side of the round seal in the area of the planar seal. Each of these lugs fits into a cut out portion of matching shape provided in the planar seal, after the fashion of a jigsaw puzzle. As the adjoining edges are thus located entirely in the plane of the seal, the present invention has solved the problem of defective sealing owing to the cross-over between a round surface and a plane surface.

Other characteristics of the invention will emerge from the description that follows of two particular forms of embodiment of the invention, the said description being based upon the annexed drawings, wherein:

FIG. 1 is a top view of the lower part of a cable connecting box equipped with through seals according to a first form of embodiment of the invention;

FIG. 2 is a perspective view of one of the through seals of FIG. 1;

FIG. 3 is a top view of a cylindrical through seal according to a second form of embodiment of the invention; and FIG. 4 is a perspective view of the through seal of FIG. 3.

FIG. 1 shows the lower part, 9, of a connecting box provided with four (by way of example) input/output ports, 8a, 8b, 8c and 8d, each of which is filled with a through seal. Two of these seals are, in this figure, already placed in their respective housings, while the other two are ready to take up position therein. A flat seal, 3 (indicated by cross-hatching), is disposed on the periphery of the box, with interruptions at the locations of input/output ports 8.

FIG. 2 schematically illustrates a through seal, 12, essentially constituted by a cylindrical sleeve, 1, defining a longitudinal passage, 2, for the cables (not shown in the figures). Provision is made for the flat seal 3 to be inserted into two diametrically opposed longitudinal grooves, 4a and 4b, hollowed out on the periphery of sleeve 1 starting from its inner face 6 (inner in relation to the connecting box, thus from the sealing point of view). Finally, round seal 12 comprises two planar lugs, 5a and 5b, moulded in a single piece with sleeve 1 and diametrically opposed, which project on the edge of outer face 7 of sleeve 1.

FIG. 1 shows how lugs 5a and 5b are inserted into cut out portions of matching shapes provided in flat seal 3, thus ensuring excellent sealing. The problem mentioned in the introduction, relating to sealing in the area of the grooves, is solved as the said arrangement makes it possible to discontinue the grooves before they reach the outer face 7 of sleeve 1. Outside dusts or liquids are thus deprived of a path that would enable them to enter the box via the said grooves.

Grooves can even be entirely dispensed with, as shown in FIGS. 3 and 4, which illustrate an alternative form of embodiment of the invention. In this case, planar lugs, 10a and 10b, extend over the entire length of sleeve 1 between its inner and outer faces. Each of the two lugs 10a (10b, respectively) bears, on its free edge, one or more projections, 11a (11b, respectively) designed to be inserted into mating cut out portions in planar seal 3 (not shown).

It is quite clear that several characteristics of the sealing device described above have been given only by way of example, and that they are not essential in relation to the main ideas of the invention. In particular, the non-planar seal can have any rounded outer surface, instead of being cylindrical.

What is claimed is:

1. A sealing device, comprising: a round seal having a non-planar outer surface and a contiguous flat seal, wherein a pair of planar lugs project laterally from opposing sides of the outer surface, the pair of planar lugs integrally molded with the round seal and fitted into a corresponding pair of cut out portions provided in the flat seal so as to locate an interface between the round seal and the flat seal in a plane of the flat seal, and wherein the outer surface of the round seal includes a pair of longitudinal grooves extending from an inner end to before reaching an outer end of the round seal to ensure tightness, the pair of longitudinal grooves being arranged to accommodate the flat seal and to allow the pair of planar lugs to project from the outer surface of the round seal.

2. A sealing device, comprising: a round seal having a non-planar outer surface, and a contiguous flat seal, wherein a pair of planar lugs project laterally from opposing sides of the outer surface, the pair of planar lugs integrally molded with the round seal and fitted into a corresponding pair of cut out portions provided in the flat seal so as to locate an interface between the round seal and the flat seal in a plane of the flat seal, and wherein the pair of planar lugs extend over a length of the round seal between an inner end and an outer end of the round seal, each of the pair of planar lugs having at least one projection on a free edge of the pair of planar lugs for insertion into a corresponding at least one cut out portion provided in the flat seal.

3. A sealing device, comprising:
a non-planar seal defined by a longitudinal length, an inner end, an outer end, and an outer surface, the non-planar seal having:
- at last one planar lug projecting laterally from the outer surface, the at least one planar lug being an integral part of the non-planar seal, and
- at least one longitudinal groove hollowed out of the outer surface extending from the inner end to before reaching the outer end; and a planar seal having at least one cut out portion corresponding to the at least one planar lug to locate an interface between the non-planar seal and the planar seal;

wherein the at least one longitudinal groove are arranged so that the planar seal can be inserted into the non-planar seal, and that the at least one planar lug projects from the outer end.

4. A sealing device, comprising:
a non-planar seal defined by a longitudinal length, an inner end, an outer end, and an outer surface, the non-planar seal having at least one planar lug integral of the non-planar seal projecting laterally from the outer surface, the at least one planar lug extending over the longitudinal length between the inner and outer ends, and bearing at least one projection; and a planar seal having at least one cut out portion corresponding to the at least one planar lug and the at least one projection to locate an interface between the non-planar seal and the planar seal.

\* \* \* \* \*